United States Patent
Therriault et al.

(10) Patent No.: US 12,211,477 B2
(45) Date of Patent: Jan. 28, 2025

(54) ACOUSTIC PANEL AND ASSOCIATED MANUFACTURING METHOD

(71) Applicant: SAFRAN, Valin (FR)

(72) Inventors: Daniel Therriault, Moissy-Cramayel (FR); Filippo Iervolino, Moissy-Cramayel (FR); Juliette Pierre, Moissy-Cramayel (FR); Nicola Piccirelli, Moissy-Cramayel (FR); Annie Ross, Moissy-Cramayel (FR); Josué Costa Baptista, Moissy-Cramayel (FR)

(73) Assignee: SAFRAN, Paris (FR)

( * ) Notice: Subject to any disclaimer, the term of this patent is extended or adjusted under 35 U.S.C. 154(b) by 217 days.

(21) Appl. No.: 18/012,108

(22) PCT Filed: Jun. 7, 2021

(86) PCT No.: PCT/FR2021/051015
§ 371 (c)(1),
(2) Date: Dec. 21, 2022

(87) PCT Pub. No.: WO2021/260286
PCT Pub. Date: Dec. 30, 2021

(65) Prior Publication Data
US 2023/0252966 A1    Aug. 10, 2023

(30) Foreign Application Priority Data
Jun. 23, 2020  (CA) ................................ CA 3084631

(51) Int. Cl.
B64D 33/02    (2006.01)
B32B 3/12     (2006.01)
(Continued)

(52) U.S. Cl.
CPC .............. *G10K 11/172* (2013.01); *B32B 3/12* (2013.01); *B32B 3/266* (2013.01); *B32B 27/08* (2013.01);
(Continued)

(58) Field of Classification Search
CPC .. G10K 11/168; G10K 11/172; G10K 11/161; G10K 11/16; B32B 3/12;
(Continued)

(56) References Cited

U.S. PATENT DOCUMENTS 3,734,234 A    5/1973 Wirt
3,819,007 A *  6/1974 Wirt .......................... E04B 1/86
                                                       428/116

(Continued)

FOREIGN PATENT DOCUMENTS

CN    114203137 A  *  3/2022
CN    117877452 A  *  4/2024
(Continued)

OTHER PUBLICATIONS

International Search Report mailed Oct. 13, 2021, issued in corresponding International Application No. PCT/FR2021/051015, filed Jun. 7, 2021, 7 pages.
(Continued)

*Primary Examiner* — Edgardo San Martin
(74) *Attorney, Agent, or Firm* — CHRISTENSON O'CONNOR JOHNSON KINDNESS PLLC

(57) ABSTRACT

An acoustic panel has two substantially parallel skins between which cavities forming Helmholtz resonators are arranged. One of the skins is bored with orifices, each of which opens into one of said cavities and forms a neck of the resonators. One or more of said cavities includes of a hollow structure having the shape of a triangular-based prism.

10 Claims, 4 Drawing Sheets

(51) Int. Cl.

| | | |
|---|---|---|
| *B32B 3/26* | (2006.01) | |
| *B32B 27/08* | (2006.01) | |
| *B33Y 80/00* | (2015.01) | |
| *E04B 1/84* | (2006.01) | |
| *F02K 1/82* | (2006.01) | |
| *G10K 11/168* | (2006.01) | |
| *G10K 11/172* | (2006.01) | |
| *B29C 64/118* | (2017.01) | |
| *B33Y 10/00* | (2015.01) | |

(52) U.S. Cl.
CPC ............ *B33Y 80/00* (2014.12); *G10K 11/168* (2013.01); *B29C 64/118* (2017.08); *B32B 2250/03* (2013.01); *B32B 2250/40* (2013.01); *B32B 2307/102* (2013.01); *B32B 2607/00* (2013.01); *B33Y 10/00* (2014.12)

(58) Field of Classification Search
CPC ... B32B 3/26; B32B 3/266; E04B 2001/8423; E04B 2001/8428; E04B 2001/8433; E04B 2001/8476; E04B 2001/848; E04B 2001/8485; B33Y 80/00; B33Y 10/00
See application file for complete search history.

(56) References Cited

U.S. PATENT DOCUMENTS

| | | | | |
|---|---|---|---|---|
| 3,831,710 A * | 8/1974 | Wirt | ............... | B32B 27/08 428/116 |
| 3,887,031 A * | 6/1975 | Wirt | ............... | G10K 11/172 181/292 |
| 4,296,831 A * | 10/1981 | Bennett | ............... | F02B 77/13 181/292 |
| 4,298,090 A * | 11/1981 | Chapman | ............... | F02K 1/827 181/292 |
| 5,760,349 A * | 6/1998 | Borchers | ............... | F41B 15/08 181/293 |
| 6,290,022 B1 * | 9/2001 | Wolf | ............... | G10K 11/172 181/295 |
| 6,352,134 B1 * | 3/2002 | Wang | ............... | E04B 9/34 181/292 |
| 7,819,224 B2 * | 10/2010 | Borchers | ............... | F01D 25/30 181/292 |
| 8,689,936 B2 * | 4/2014 | Richter | ............... | G10K 11/172 52/145 |
| 8,997,923 B2 * | 4/2015 | Ichihashi | ............... | F02C 7/045 181/292 |
| 10,808,399 B2 * | 10/2020 | Alstad | ............... | E04B 2/7409 |
| 11,028,774 B2 * | 6/2021 | Piccirelli | ............... | G10K 11/172 |
| 11,208,193 B2 * | 12/2021 | Ravise | ............... | G10K 11/168 |
| 11,348,565 B2 * | 5/2022 | Ravise | ............... | F02K 1/827 |
| 11,524,792 B2 * | 12/2022 | Simon | ............... | B64D 29/00 |
| 11,952,136 B2 * | 4/2024 | Porte | ............... | G10K 11/172 |
| 12,083,778 B2 * | 9/2024 | Cariou | ............... | F02K 1/827 |
| 2002/0036115 A1 | 3/2002 | Wilson | | |
| 2013/0118831 A1 * | 5/2013 | Kawai | ............... | G10K 11/172 181/290 |
| 2017/0072674 A1 * | 3/2017 | Butler | ............... | B32B 37/146 |
| 2017/0301334 A1 | 10/2017 | Nampy | | |
| 2019/0270504 A1 | 9/2019 | Cedar et al. | | |
| 2024/0101264 A1 * | 3/2024 | Riou | ............... | F02K 1/827 |
| 2024/0262042 A1 * | 8/2024 | Lanfant | ............... | B29C 66/1142 |
| 2024/0262522 A1 * | 8/2024 | Guillois | ............... | B64D 33/02 |
| 2024/0270400 A1 * | 8/2024 | Lanfant | ............... | B64D 33/02 |

FOREIGN PATENT DOCUMENTS

| | | | | |
|---|---|---|---|---|
| DE | 102016124678 A1 * | 7/2017 | | |
| EP | 3650332 A1 * | 5/2020 | ............... | B32B 3/12 |
| FR | 3069091 B3 * | 11/2019 | ............... | F02C 7/24 |
| GB | 822954 A | 11/1959 | | |

OTHER PUBLICATIONS

Written Opinion mailed Oct. 13, 2021, issued in corresponding International Application No. PCT/FR2021/051015, filed Jun. 7, 2021, 6 pages.

* cited by examiner

ACOUSTIC PANEL AND ASSOCIATED MANUFACTURING METHOD

TECHNICAL FIELD

The present invention relates, in general, to acoustic attenuation and, more particularly, to the devices intended for acoustic attenuation, in particular in the aerospace field.

More precisely, the invention relates to an acoustic panel, in particular an acoustic panel for a propulsion unit.

The invention also relates to a method for manufacturing such an acoustic panel.

PRIOR ART

One of the major ambitions of the aerospace industry is the reduction of the noise emitted by aircraft.

One of the known solutions allowing this reduction involves using acoustic panels, for example on the inner surface of the fan casing of a turbomachine, and the sound-dissipation mechanism of which is based on the principle of Helmholtz resonance.

A Helmholtz resonator (HR) consists of a cavity connected to the outside environment by a neck. The sound can thus penetrate into the resonator by the neck before being dissipated in the cavity. The resonator attenuates the sound at the natural frequency of the resonance chamber while following the following equation:

$$f_r = \frac{v}{2\pi}\sqrt{\frac{\pi D_n^2/4}{V_c L_n}}$$

where $D_n$ is the opening diameter of the neck; $L_n$ is the length of the neck; $V_c$ the volume of the cavity; $f_r$ is the resonance frequency of the resonator; and v is the speed of sound in air.

The geometric parameters of the resonator thus determine the frequency at which the sound is dissipated.

Although such a resonator is particularly advantageous for the dissipation of sound at low frequency, around 500-600 Hz, this absorption frequency range is narrow, and thus works aiming to multiply the absorption peaks have been carried out.

Typically, an existing acoustic panel applying this principle, called "sandwich panel", comprises two substantially parallel skins between which are located and extend cavities forming Helmholtz resonators and for example organised in a honeycomb (hexagonal cross-section). One of the skins is bored with orifices opening into the cavities and forming necks of the resonators.

Nevertheless, the structures of the resonators of the known acoustic panels only allow to obtain the absorption at a given absorption frequency and the stacking of various panels is necessary for absorption at various frequencies.

DISCLOSURE OF THE INVENTION

The goal of the invention is therefore to overcome these disadvantages and propose a panel that is not very costly and easy to produce, allowing both the absorption of noise at relatively low frequencies and the absorption of noise over a sufficiently broad frequency range.

An acoustic panel is thus proposed comprising two substantially parallel skins between which cavities forming Helmholtz resonators are disposed, one of said skins being bored with orifices each opening into one of said cavities and forming a neck of the resonators.

Moreover, one or more of these cavities are formed by a hollow structure in the shape of a right prism with a triangular base.

Advantageously, the acoustic panel can comprise one or more assemblies of structures in the shape of a right prism with a triangular base defined by lateral walls and each including one or more of said cavities.

Preferably, one or more assemblies comprise at least four structures each in the shape of a right prism with a triangular base and a central cavity formed between the structures formed by a right prism with a triangular base.

According to one embodiment, said skin bored with orifices can comprise a first orifice and a second orifice respectively opening into a first cavity and into a second cavity out of the four cavities formed by a structure in the shape of a right prism with a triangular base and a third orifice opening into the central cavity.

According to another embodiment, said skin bored with orifices comprises a fourth orifice and a fifth orifice respectively opening into a third cavity and a fourth cavity out of the four cavities formed by a structure in the shape of a right prism with a triangular base.

Preferably, the acoustic panel includes two or more different orifice diameters.

Advantageously, the structure formed by a right prism with a triangular base are connected to one of said skins by one of their edges, and the interface between the edge and the skin can comprise an enlarged portion.

Preferably, the acoustic panel forms a monolithic structure.

The invention also relates to a method for manufacturing an acoustic panel, the method comprising a step of manufacturing by additive manufacturing an acoustic panel as described above.

Preferably, the step of manufacturing by additive manufacturing is carried out by the technique of Fused Filament Fabrication, FFF.

BRIEF DESCRIPTION OF THE DRAWINGS

Other goals, advantages and features will be clear from the following description, given purely for illustrative purposes and made in reference to the appended drawings in which.

DETAILED DISCLOSURE OF A FIRST EMBODIMENT

Figure 1:
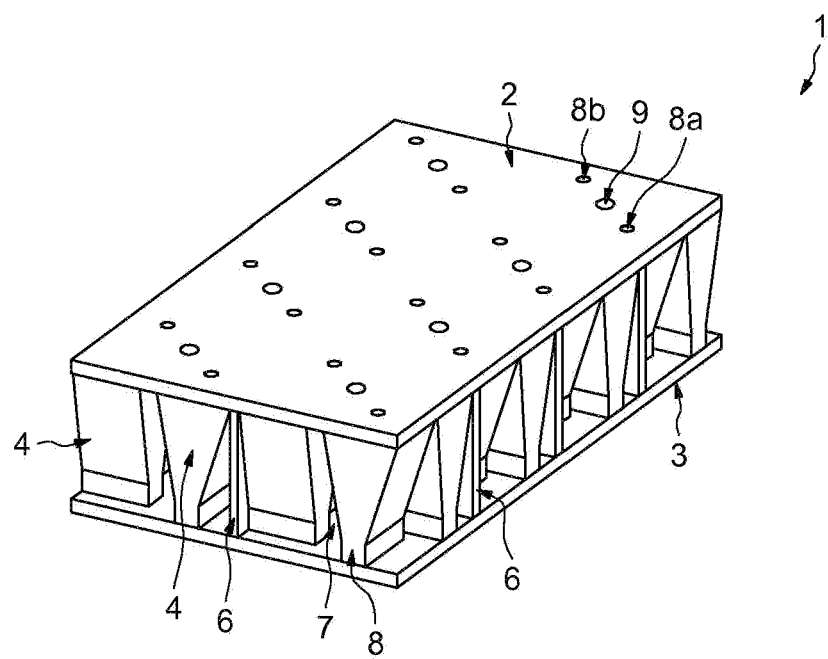
FIG. 1 illustrates an acoustic panel according to a first embodiment according to the invention, formed by a plurality of assemblies of cavities in the resonance core and by a bored skin including three orifices per assembly of cavities.

FIG. 1 illustrates an acoustic panel 1 for a turbomachine, according to the invention.

The acoustic panel 1 is a panel called "sandwich panel". It comprises first and second substantially parallel skins 2 and 3 between which cavities forming Helmholtz resonators are disposed.

One of said skins, in this example the first skin 2, is bored with orifices each opening into one of said cavities and forming a neck of the resonators.

Moreover, one or more of said cavities are formed by a hollow structure 4 in the shape of a right prism with a triangular base.

Figure 2:
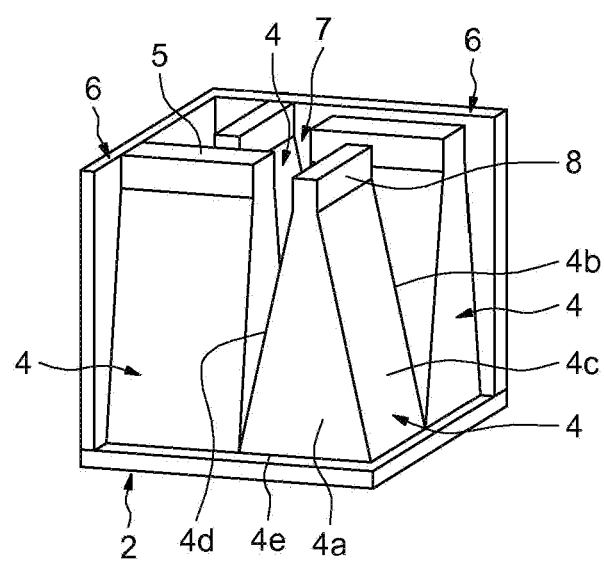
FIG. 2 is a perspective view of an assembly of cavities of the plurality of assemblies of cavities of the resonance core of the acoustic panel according to the first embodiment illustrated in FIG. 1.
Figure 3:
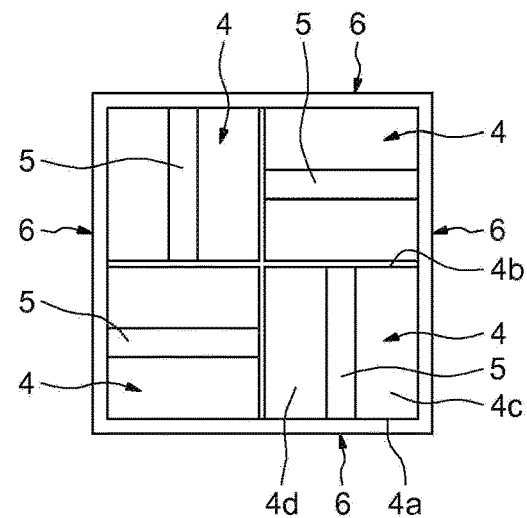
FIG. 3 is a bottom view of the assembly of cavities of the resonance core illustrated in FIG. 2.

As visible in FIGS. 2 and 3, the structure 4 in the shape of a right prism with a triangular base includes two opposite triangular bases 4a and 4b and two opposite rectangular faces 4c and 4d extending from a shared square face 4e. The junction of the two bases 4a and 4b and of the two faces 4c and 4d forms an edge 5 disposed opposite to the square face 4e. The structure 4 is hollow and thus encloses a cavity.

All the cavities are preferably formed by structures 4 in the shape of a right prism with a triangular base, forming a honeycomb configuration between the two skins 2 and 3.

The cavities of the various structures 4 in the shape of a right prism with a triangular base are independent of each other and do not communicate.

Preferably, the structures 4 forming the cavities are defined in several assemblies or cells by lateral walls 6. The acoustic panel is thus formed by a plurality of assemblies of structures 4 in the shape of a right prism with a triangular base.

In FIG. 2, only two of the four lateral walls 6 of an assembly have been shown for easier comprehension of the arrangement of the structures 4.

In the example illustrated in FIG. 1, each assembly comprises four structures 4 in the shape of a right prism with a triangular base. A perspective view and a bottom view of an assembly are shown in FIGS. 2 and 3.

The four structures 4 shown are disposed at 90° with respect to each other, with respect to an axis passing through the two skins 2 and 3 and perpendicular to the two skins 3 and 3. This arrangement advantageously allows to optimise the space.

Moreover, the four structures 4 of an assembly are disposed so that each edge 5 is disposed facing the second skin 3.

Each assembly also comprises a central cavity 7 formed between the structures 4 formed by a right prism with a triangular base. In other words, the central cavity 7 corresponds to the free space inside an assembly defined by the lateral walls 6, between the structures 4.

According to the first embodiment shown, the skin bored with orifices, which corresponds here to the first skin 2, can comprise three orifices in the same assembly. A first orifice 8a and a second orifice 8b respectively open into a first cavity and into a second cavity out of the four cavities formed by a structure in the shape of a right prism with a triangular base, preferably at the square faces 4e.

Moreover, a third orifice 9 opens into the central cavity 7.

The first and second orifices 8a and 8b have, in this example, different diameters. Moreover, the diameter of the third orifice 9 is greater than the diameters of the first and second orifices 8a and 8b.

For example, the first and second orifices 8a and 8b can be disposed so that they open into two of the four structures 4 formed by a right prism with a triangular base, disposed diagonally inside the same assembly of structures 4.

In this embodiment, two of the four structures 4 formed by a right prism with a triangular base are not used as a resonance cavity.

The structures 4 formed by a right prism with a triangular base are connected to one of said skins 2 and 3, in this example the second skin 3, by the edge 5. Preferably, the interface between the edge 5 and the skin comprises an enlarged portion or border reinforcing the mechanical stability of the acoustic panel via the reinforcement of the connection between the structures 4 and the second skin.

The four cavities of the structures 4 in the shape of a right prism with a triangular base thus each form a Helmholtz resonator.

Figure 4:
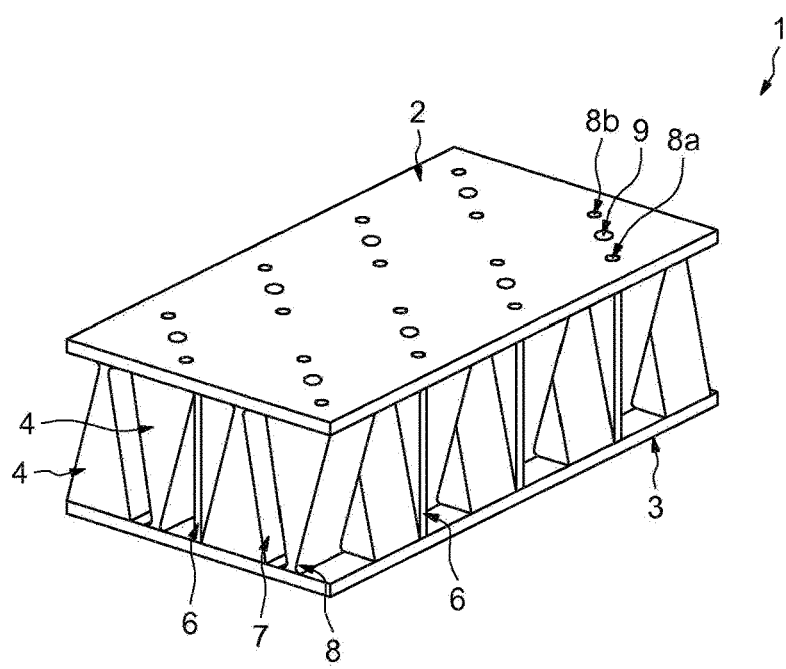
FIG. 4 illustrates an acoustic panel according to the first embodiment, in which the cavities of an assembly of cavities are disposed according to an alternative, top-to-tail configuration.

According to an alternative illustrated in FIG. 4, the structures 4 in the shape of a right prism with a triangular base can be disposed according to a top-to-tail configuration in order to optimise the space inside the acoustic panel.

Figure 5:
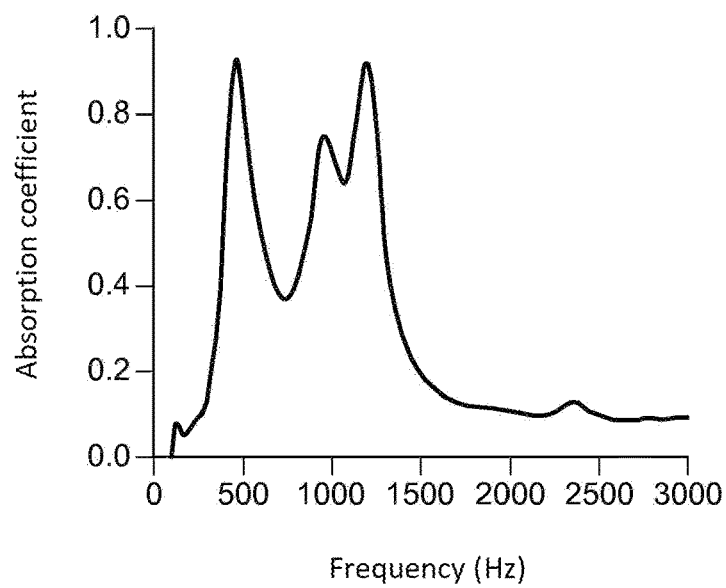
FIG. 5 is a graph showing the change in the absorption coefficient according to the frequency associated with an acoustic panel according to the first embodiment illustrated in FIG. 4.

The graph of FIG. 5 shows the change in the absorption coefficient according to the frequency, in Hz, measured on an acoustic panel having a configuration with three orifices, as illustrated in FIG. 4, the structures disposed top to tail. In the example illustrated, the thickness of the first bored skin, and thus of the neck associated with the orifices 8a, 8b and 9, was chosen as equal to 4 mm and the diameter of the first, second and third orifices 8a, 8b and 9 is respectively 2, 2.5 and 3 mm.

In this configuration, three well-defined absorption peaks can be observed in the drawing. In this configuration, the peaks can be observed around 500 Hz, 1100 Hz and 1400 Hz.

The resonators formed by the central cavity 7, having a volume greater than the cavities of the structures 4, generate the peak at low frequency around 500 Hz, while the resonators formed by the two structures 4 in the shape of a right prism with a triangular base into which the orifices 8a and 8b open generate the two peaks at high frequencies, around 1100 and 1400 Hz.

The use of the two types of cavities is particularly advantageous and allows to obtain a plurality of peaks over a broad range of frequencies between 500 and 1500 Hz.

Detailed Disclosure of a Second Embodiment

Figure 6:
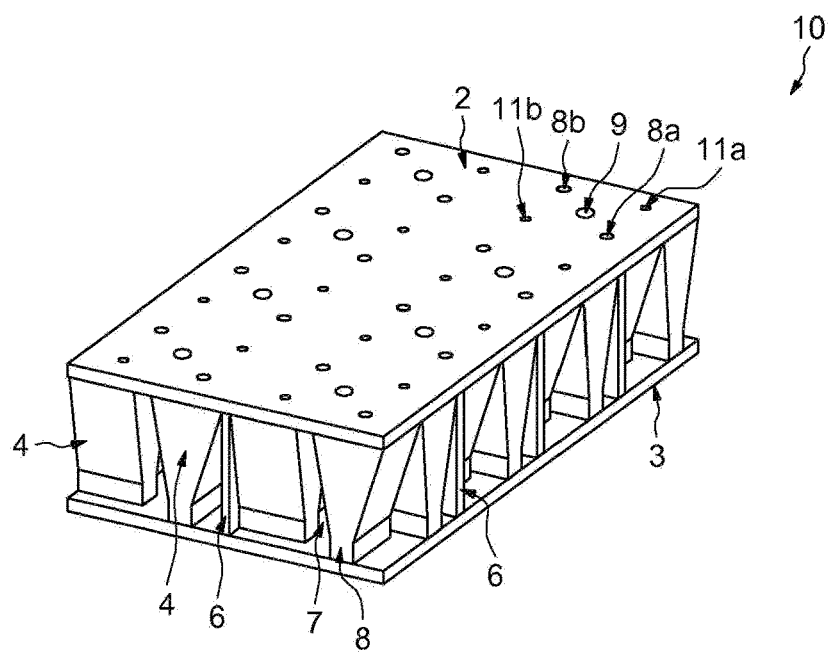
FIG. 6 illustrates an acoustic panel according to a second embodiment according to the invention, formed by a plurality of assemblies of cavities in the resonance core and by a bored skin including five orifices per assembly of cavities.

FIG. 6 illustrates a second embodiment of an acoustic panel case 10 in which the bored skin comprises five orifices. Similarly to the first embodiment illustrated in FIG. 1, the first skin 2 comprises a first orifice 8a and a second orifice 8b respectively opening into a first cavity and into a second cavity out of the four cavities formed by a structure 4 in the shape of a right prism with a triangular base, preferably at the square faces 4e.

Moreover, the first skin 2 comprises a fourth orifice 11a and a fifth orifice 11b respectively opening into a third cavity and a fourth cavity out of the four cavities formed by a structure 4 in the shape of a right prism with a triangular base.

Preferably, the various orifices 8a, 8b, 9, 11a and 11b have four or five different diameters.

Figure 7:
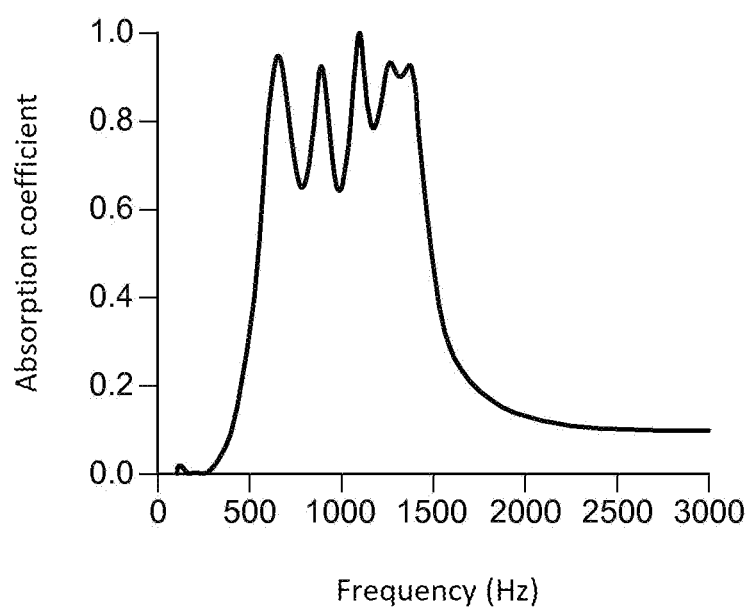
FIG. 7 is a graph showing the change in the absorption coefficient according to the frequency associated with an acoustic panel according to the second embodiment illustrated in FIG. 6.

The graph of FIG. 7 shows the change in the absorption coefficient according to the frequency, in Hz, measured on an acoustic panel having a configuration with five orifices, as illustrated in FIG. 6. In the example illustrated, the thickness of the first bored skin, and thus of the neck associated with the orifices 8a, 8b and 9, was chosen as equal to 3 mm and the diameter of the first, second, third, fourth and fifth orifices 8a, 8b and 9 is respectively 2, 2.5, 3.5, 3 and 3 mm.

Five well-defined absorption peaks can be observed in the drawing. In this configuration, the peaks are observed at low frequency around 500 Hz, and at a higher frequency around 800 Hz, 1100 Hz, 1400 Hz and 1500 Hz.

The resonators formed by the central cavity 7, having a volume greater than the cavities of the structures 4, generate the peak at low frequency around 500 Hz, while the resonators formed by the four structures 4 in the shape of a right prism with a triangular base into which the orifices 8a, 8b, 11a and 11b open generate the four peaks at the higher frequencies.

The use of the two types of cavities is particularly advantageous and allows to obtain a plurality of peaks over a broad range of frequencies between 500 and 1500 Hz.

Such an acoustic panel allows to obtain an absorption greater than the panel including the three orifices, in particular between 600 and 1000 Hz. A broad range of absorption frequencies, between 500 and 1500 Hz, is obtained.

Of course, it is possible for the acoustic panel to comprise a number of different orifice diameters different than three or five, for example two, four or more than five.

Preferably, the acoustic panel 1, 10 forms a monolithic structure.

Monolithic means in the sense of the invention a structure formed by a single block.

As elaborated on above, the acoustic panels 1, 10 according to the invention allow an absorption of noise over a broad range of frequencies 600-1500 Hz, via multiple absorption peaks.

The invention also relates to a method for manufacturing an acoustic panel 1, 10. The method comprises a step of manufacturing by additive manufacturing. The additive manufacturing thus has the advantage of being able to manufacture an acoustic panel, for example the acoustic panels 1 and 10, simply and quickly, in a single step.

Preferably, the step of manufacturing by additive manufacturing is carried out by the technique of Fused Filament Fabrication, FFF, particularly adapted to the production of a complex structure as described above, comprising structures 4 formed by right prisms with a triangular base.

Additive manufacturing means the manufacturing of a part by successive deposition or consolidation of the layers of material.

The acoustic elements are thus made in a single operation, and are thus monolithic.

The acoustic panel, preferably manufactured by additive manufacturing, can comprise at least one reinforced thermoplastic material and/or at least one non-reinforced thermoplastic material.

Reinforced material means a composite material in which fillers improve the properties, for example mechanical, of a matrix.

According to one example, the first and second skins 2 and 3 of an acoustic panel can be made from a reinforced thermoplastic material, for example carbon fibres, while simultaneously, the cavities are made from a non-reinforced thermoplastic material. The manufacturing by additive manufacturing of such an acoustic panel can be carried out in a single operation, by a device comprising two extrusion heads, preferably by the technique of Fused Filament Fabrication, FFF.

Preferably, the acoustic panel is manufactured from a thermoplastic polymer material, for example polyamide, or from a composite material with a polymer matrix, particularly advantageous for the additive manufacturing by fused filament fabrication and allowing both to reinforce and to lighten the structure. According to one embodiment, the composite material with a polymer matrix can include carbon fibre fillers.

The acoustic panel thus combines increased mechanical strength and noise absorption capacity.

It should be noted that it is also possible for the creation of the various orifices 8a, 8b, 9, 11a and 11b to be carried out in a second step, after the step of manufacturing by additive manufacturing the acoustic panel 1, 10, by a mechanical method.

The invention claimed is:

1. An acoustic panel comprising two parallel skins between which cavities forming Helmholtz resonators are disposed, one of said skins being bored with orifices each opening into one of said cavities and forming a neck of the resonators, wherein one or more of said cavities are formed by a hollow structure in the shape of a right prism with a triangular base, the acoustic panel further comprising one or more assemblies of hollow structures in the shape of a right prism with a triangular base defined by lateral walls and each including one or more of said cavities, the one or more assemblies comprising at least four hollow structures in the shape of a right prism with a triangular base and a central cavity formed between the hollow structures in the shape of a right prism with a triangular base, the central cavity corresponding to a free space between the at least four hollow structures.

2. The acoustic panel according to claim 1, wherein said skin bored with orifices comprises a first orifice and a second orifice respectively opening into a first cavity and into a second cavity out of the four cavities formed by a structure in the shape of a right prism with a triangular base and a third orifice opening into the central cavity.

3. The acoustic panel according to claim 2, wherein said skin bored with orifices comprises a fourth orifice and a fifth orifice respectively opening into a third cavity and a fourth cavity out of the four cavities formed by a structure in the shape of a right prism with a triangular base.

4. The acoustic panel according to claim 1, further comprising two or more different orifice diameters.

5. The acoustic panel according to claim 1, wherein the structures formed by a right prism with a triangular base are connected to one of said skins by one of their edges, the interface between the edge and the skin comprising an enlarged portion.

6. The acoustic panel according to claim 1, wherein the acoustic panel forms a monolithic structure.

7. A method for manufacturing an acoustic panel, the method comprising a step of manufacturing by additive manufacturing the acoustic panel according to claim 1.

8. The method according to claim 7, wherein the first and second skins are made from a reinforced thermoplastic material and the hollow structures are made from a non-reinforced thermoplastic material.

9. The method according to claim 7, wherein the step of manufacturing by additive manufacturing is carried out by the technique of Fused Filament Fabrication, FFF.

10. The method according to claim 8, wherein the step of manufacturing by additive manufacturing is carried out by the technique of Fused Filament Fabrication, FFF.

\* \* \* \* \*